US007067219B2

(12) United States Patent
Otsuki et al.

(10) Patent No.: US 7,067,219 B2
(45) Date of Patent: Jun. 27, 2006

(54) ADDITIVE FOR NONAQUEOUS-ELECTROLYTE SECONDARY BATTERY

(75) Inventors: Masashi Otsuki, Musashimurayama (JP); Shigeki Endo, Tokorozawa (JP); Takao Ogino, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 331 days.

(21) Appl. No.: 10/363,172

(22) PCT Filed: Sep. 5, 2001

(86) PCT No.: PCT/JP01/07691

§ 371 (c)(1),
(2), (4) Date: Mar. 31, 2003

(87) PCT Pub. No.: WO02/21630

PCT Pub. Date: Mar. 14, 2002

(65) Prior Publication Data

US 2003/0175597 A1 Sep. 18, 2003

(30) Foreign Application Priority Data

Sep. 7, 2000 (JP) ............................ 2000-272084
Sep. 7, 2000 (JP) ............................ 2000-272085

(51) Int. Cl.
*H01M 6/16* (2006.01)

(52) U.S. Cl. ....................... 429/326; 429/306; 429/324

(58) Field of Classification Search ................ 429/306, 429/324, 326, 304
See application file for complete search history.

(56) References Cited

U.S. PATENT DOCUMENTS

| | | | | |
|---|---|---|---|---|
| 6,180,800 | B1 * | 1/2001 | Yokoyama et al. | 549/229 |
| 6,475,679 | B1 * | 11/2002 | Tsutiya et al. | 429/339 |

FOREIGN PATENT DOCUMENTS

| | | | |
|---|---|---|---|
| JP | A 9-50944 | | 2/1987 |
| JP | A 6-13108 | | 1/1994 |
| JP | 11-144757 | * | 5/1999 |
| JP | A 11-144757 | | 5/1999 |
| JP | A 11-185808 | | 7/1999 |
| JP | A 11-191431 | | 7/1999 |
| JP | A 2000-30740 | | 1/2000 |
| JP | A 2000-173619 | | 6/2000 |
| JP | A 2001-102088 | | 4/2001 |
| JP | A 2001-139584 | | 5/2001 |
| JP | A 2001-217001 | | 8/2001 |
| JP | A 2001-217155 | | 8/2001 |
| JP | A 2001-217156 | | 8/2001 |

* cited by examiner

*Primary Examiner*—Dah-Wei Yuan
(74) *Attorney, Agent, or Firm*—Oliff & Berridge, PLC

(57) ABSTRACT

The present invention provides an additive which is able to make a non-aqueous-electrolyte secondary cell or a non-aqueous electrolyte electric double layer capacitor which is excellent in low-temperature characteristics, while maintaining a necessary cell properties, and a non-aqueous-electrolyte secondary cell or a non-aqueous electrolyte electric double layer capacitor that contains therein the additive. The additive contains at least one of tautomers of phosphazene derivatives represented by formulae (1) and (2):

formula (1)

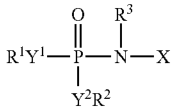

formula (2)

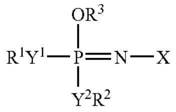

wherein $R^1$, $R^2$ and $R^3$ independently represent a monovalent substituent or a halogen element; X represents a substituent containing at least one selected from a group of carbon, silicon, germanium, tin, nitrogen, phosphorus, arsenic, antimony, bismuth, oxygen, sulfur, selenium, tellurium and polonium; and $Y^1$ and $Y^2$ independently represent a divalent connecting group, a divalent element or a single bond.

22 Claims, No Drawings

ADDITIVE FOR NONAQUEOUS-ELECTROLYTE SECONDARY BATTERY

TECHNICAL FIELD

The present invention relates to a non-aqueous electrolyte secondary cell which is excellent in self-extinguishability or flame retardancy, deterioration resistance, and low-temperature characteristics, while maintaining the same cell properties as those of conventional non-aqueous electrolyte secondary cells. Further, the present invention relates to a non-aqueous electrolyte double layer capacitor which is used for various energy storage devices such as backup power supplies and auxiliary power supplies, and more particularly to a non-aqueous electrolyte electric double layer capacitor which is excellent in self-extinguishability or flame retardancy, deterioration resistance, and low-temperature characteristics.

BACKGROUND ART

Conventionally, nickel-cadmium cells have been the main cells used as secondary cells for memory-backup or sources for driving AV (Audio Visual) and information devices, particularly personal computers, VTRs (video tape recorders) and the like. Lately, non-aqueous electrolyte secondary cells have been drawing a lot of attention as a replacement for the nickel-cadmium cells because non-aqueous electrolyte secondary cells have advantages of high voltage, high energy concentration, and displaying excellent self-dischargeability. Various developments of the non-aqueous electrolyte secondary cells have been performed and a portion of these developments has been commercialized. For example, more than half of notebook type personal computers, cellular phones and the like are driven by the non-aqueous electrolyte secondary cells.

Carbon is often used as a cathode material in the non-aqueous electrolyte secondary cells, and various organic solvents are used as electrolytes in order to mitigate the risk when lithium is produced on the surface of cathode, and to increase outputs of driven voltages. Further, particularly in non-aqueous electrolyte secondary cells for use in cameras, alkali metals (especially, lithium metals or lithium alloys) are used as the cathode materials, and aprotic organic solvents such as ester organic solvents are ordinarily used as the electrolytes.

However, although these non-aqueous electrolyte secondary cells exhibit high performance, they have the problem described below with safety.

Namely, alkali metals (especially, lithium metals or alloys) that are used as negative electrode materials for the non-aqueous electrolyte secondary cells are extremely highly-active with respect to water. Therefore, for example, when the non-aqueous electrolyte secondary cell is imperfectly sealed, and water enters therein, a problem occurs in that negative electrode materials and water are reacted with each other, whereby hydrogen is generated to ignite the cell. Further, since a lithium metal has a low melting point (about 170° C.), when a large current is suddenly flown into a cell during a short circuit or the like, and an excessive amount of heat is generated, an extremely high danger occurs in which the cell is molten or the like. Moreover, due to the generation of heat, when the electrolyte is evaporated or decomposed to generate gas, a danger occurs in which the cell explodes and ignites.

In order to solve the aforementioned problems, when temperature ascends and pressure inside the cell rises during the short circuit or overcharge of a cylindrical cell, for example, a method having a mechanism in which an excessive amount of current is prevented from flowing into the cylindrical cell by a break of electrode terminals at the same time when the safety valve is operated (Nikkan Kogyo Shinbun, *Electronic Technology*, Vol. 39, No. 9, 1997).

However, it is not necessary ensured that the mechanism operates normally all the time. When the mechanism does not operate normally, a possibility of danger still remains in which more heat is generated by the excessive current thus causing the cell to ignite.

Thus, development has been a high demand of an excellent non-aqueous electrolyte secondary cell which does not need a safety mechanism such as a safety valve but is able to mitigate risks due to evaporation, decomposition, or ignition of the electrolyte, and exhibit fundamentally high safety and which also exhibit stability as good as that in conventional non-aqueous electrolyte secondary cells, good resistance to deterioration, and good electrochemical characteristics.

Further, development has been required of non-aqueous electrolyte secondary cells which have excellent low-temperature characteristics because cell properties must be maintained for a long period of time even under low-temperature conditions such as in the regions or season in which temperature is low.

On the other hand, a non-aqueous electrolyte electric double layer capacitor is a condenser making use of electric double layers formed between polarizable electrodes and electrolytes.

The electric double layer capacitor is different from a cell in which a cycle of an oxidation-reduction reaction accompanied by substance movements is a charging/discharging cycle in that a cycle for electrically absorbing, on electrode surfaces, ions from electrolytes is a charging/discharging cycle. For this reason, the electric double layer capacitor is more excellent in instant charging/discharging properties than those of a cell. Repeatedly charging/discharging the capacitor does not deteriorate the instant charging/discharging properties. Further, in the electric double layer capacitor, since excessive charging/discharging voltage does not occur during charging/discharging, simple and less expensive electric circuits suffice for the capacitor. Moreover, the capacitor has more merits than the cell from the viewpoints that it is easy to know a remaining capacitance in the capacitor, and the capacitor has endurance under conditions of a wide range of temperature of from −30° C. to 90° C., and the capacitor is pollution-free. Consequently, the electric double layer capacitor is in the spotlight as a new energy storage product that is kind to the global environment.

The electric double layer capacitor is an energy storage device comprising positive and negative polarizable electrodes and electrolytes. At the interface at which the polarizable electrodes and the electrolytes come into contact with each other, positive and negative electric charges are arranged so as to face one another and be separated from one another by an extremely short distance to thereby form an electric double layer. The electrolytes play a role as ion sources for forming the electric double layer. Thus, in the same manner as for the polarizable electrodes, the electrolytes are an essential substance for controlling fundamental properties of the energy storage device.

As the electrolytes, aqueous-electrolytes, non-aqueous electrolytes, or solid electrolytes are conventionally known. However, from a viewpoint of improvement of energy concentration of the electric double layer capacitor, the non-aqueous electrolyte in which a high operating voltage is enabled has particularly been in the spotlight, and practical use thereof is progressing.

A non-aqueous electrolyte is now put to practical use in which solutes such as $(C_2H_5)_4P.BF_4$ and $(C_2H_5)_4N.BF_4$ were dissolved in highly dielectric solvents such as carbonic acid carbonates (e.g., ethylene carbonate and propylene carbonate), γ-butyrolactone, and the like.

However, these non-aqueous electrolytes have been a problem in that when a non-aqueous electrolyte electric double layer capacitor is heated and ignited, an electrolyte is ignited, flames are combusted to spread over the surfaces thereof, resulting in a high risk.

Further, these non-aqueous electrolytes has been a problem in that, as the non-aqueous electrolyte electric double layer capacitor generates heat, the non-aqueous electrolyte that uses the organic solvent as a base is evaporated or decomposed to generate gas. Due to the generated gas, the non-aqueous electrolyte electric double layer capacitor may explode or ignite thus causing the electrolyte to catch fire, flames are combusted to spread over the surfaces thereof, resulting in a high risk.

Lately, as the practical use of the non-aqueous electrolyte electric double layer capacitors has been developed, application thereof to electromobiles, hybrid cars, or the like has been expected, whereby a requirement for safety of the capacitors has been increasing more and more.

Accordingly, development of a non-aqueous electrolyte electric double layer capacitor has been increasing day by day which has a property in which risks due to evaporation, decomposition or ignition of the non-aqueous electrolyte can be mitigated and which also exhibits various excellent properties: flame retardancy when the non-aqueous electrolytes are ignited, self-extinguishability or flame retardancy, and accordingly high safety, and deterioration resistance. Further, in accordance with high evolution of technology, development of a non-aqueous electrolyte electric double layer capacitor has been a high demand in which various properties such as low internal resistance, high electric conductivity, and long term stability are accomplished at the same time.

Further, there has been a demand for development of a non-aqueous electrolyte electric double layer capacitor which is excellent in low-temperature characteristics because electric characteristics must be maintained for a long period of time even under low-temperature conditions such as in regions or season in which temperature is low.

DISCLOSURE OF INVENTION

It is an object of the present invention to solve the conventional problems described above, meet various needs, and accomplish the following objects. Namely, an object of the present invention is to provide an additive for a non-aqueous electrolyte secondary cell or a non-aqueous electrolyte electric double layer capacitor in which the addition of the additive to the non-aqueous electrolyte secondary cell or the non-aqueous electrolyte electric double layer capacitor can make the non-aqueous electrolyte secondary cell or the non-aqueous electrolyte electric double layer capacitor which is excellent in self-extinguishability or flame retardancy, resistance to deterioration, low interface resistance of a non-aqueous electrolyte, and low temperature characteristics, while maintaining required cell properties.

Another object of the present invention is to provide a non-aqueous electrolyte secondary cell and a non-aqueous electrolyte electric double layer capacitor comprising the additive described above, that are excellent in self-extinguishability or flame retardancy, and resistance to deterioration, and that exhibit low interface resistance of the non-aqueous electrolyte, and low low-temperature characteristics.

Means for solving the aforementioned problems are as follows:

The present invention provides an additive for a non-aqueous electrolyte secondary cell or a non-aqueous electrolyte electric double layer at least containing tautomers of phosphazene derivatives (hereinafter, referred to as "tautomers") represented by the following formulae (1) and (2):

formula (1):

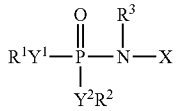

formula (2):

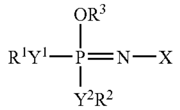

However, $R^1$, $R^2$ and $R^3$ independently represent a monovalent substituent or a halogen element, X represents a substituent containing at least one selected from a group of carbon, silicon, germanium, tin, nitrogen, phosphorus, arsenic, antimony, bismuth, oxygen, sulfur, selenium, tellurium and polonium, and $Y^1$ and $Y^2$ independently represent a divalent connecting group, a divalent element or a single bond.

The present invention provides the additive for the non-aqueous electrolyte secondary cell comprising the phosphazene derivative represented by formula (2).

The present invention provides a non-aqueous electrolyte secondary cell comprising an anode, a cathode, and a non-aqueous electrolyte comprising the additive for the non-aqueous electrolyte secondary cell and a supporting salt.

The present invention provides the non-aqueous electrolyte secondary cell, wherein a total amount of the tautomer and the phosphazene derivative represented by formula (2) in the non-aqueous electrolyte is 1 vol % or more.

The present invention provides the non-aqueous electrolyte secondary cell, wherein a total amount of the tautomer and the phosphazene derivative represented by formula (2) in the non-aqueous electrolyte is 2 vol % or more.

The present invention provides the non-aqueous electrolyte secondary cell, wherein a total amount of the tautomer and the phosphazene derivative represented by formula (2) in the non-aqueous electrolyte is 20 vol % or more.

The present invention provides the non-aqueous electrolyte secondary cell, wherein a total amount of the tautomer and the phosphazene derivative represented by formula (2) in the non-aqueous electrolyte is 30 vol % or more.

The present invention provides the non-aqueous electrolyte secondary cell, wherein the non-aqueous electrolyte contains therein an aprotic organic solvent.

The present invention provides the non-aqueous electrolyte secondary cell, wherein the aprotic organic solvent contains one of cyclic and chain ester compounds.

The present invention provides the non-aqueous electrolyte secondary cell, wherein the non-aqueous electrolyte contains therein $LiPF_6$ as the supporting salt, ethylene carbonate and/or propylene carbonate as an aprotic organic solvent, and the tautomer and the phosphazene derivative represented by formula (2) in a total amount of 1.5 to 2.5 vol %.

The present invention provides the non-aqueous electrolyte secondary cell, wherein the non-aqueous electrolyte contains therein $LiPF_6$ as the supporting salt, ethylene carbonate and/or propylene carbonate as the aprotic organic solvent, and the tautomer and the phosphazene derivative represented by formula (2) in a total amount of more than 2.5 vol %.

The present invention provides the non-aqueous electrolyte secondary cell, wherein the non-aqueous electrolyte contains therein $LiCF_3SO_3$ as the supporting salt, propylene carbonate as the aprotic organic solvent, the tautomers of the phosphazene derivatives represented by formulae (1) and (2), and the phosphazene derivative represented by formula (2) in a total amount of 1.5 to 2.5 vol %.

The present invention provides the non-aqueous electrolyte secondary cell, wherein the non-aqueous electrolyte contains therein $LiCF_3SO_3$ as the supporting salt, propylene carbonate as the aprotic organic solvent, the tautomers of the phosphazene derivatives represented by formulae (1) and (2), and the phosphazene derivative represented by formula (2) in a total amount of more than 2.5 vol %.

The present invention provides an additive for a non-aqueous electrolyte electric double layer capacitor comprising the phosphazene derivative represented by formula (2).

The present invention provides a non-aqueous electrolyte electric double layer capacitor comprising an anode; a cathode; and a non-aqueous electrolyte comprising the additive for the non-aqueous electrolyte electric double layer capacitor and a supporting salt.

The present invention provides the non-aqueous electrolyte electric double layer capacitor, wherein a total amount of the tautomer and the phosphazene derivative represented by formula (2) in the non-aqueous electrolyte is 1 vol % or more.

The present invention provides the non-aqueous electrolyte electric double layer capacitor, wherein a total amount of the tautomer and the phosphazene derivative represented by formula (2) in the non-aqueous electrolyte is 2 vol % or more.

The present invention provides the non-aqueous electrolyte electric double layer capacitor, wherein a total amount of the tautomer and the phosphazene derivative represented by formula (2) in the non-aqueous electrolyte is 20 vol % or more.

The present invention provides the non-aqueous electrolyte electric double layer capacitor, wherein a total amount in which the tautomer and the phosphazene derivative represented by formula (2) in the non-aqueous electrolyte is 30 vol % or more.

The present invention provides the non-aqueous electrolyte electric double layer capacitor, wherein the non-aqueous electrolyte contains therein an aprotic organic solvent.

The present invention provides the non-aqueous electrolyte electric double layer capacitor, wherein the aprotic organic solvent contains one of cyclic and chain ester compounds.

BEST MODE FOR CARRYING OUT THE INVENTION

A description of the present invention will be made in more detail hereinafter.

<An Additive for a Non-Aqueous Electrolyte Secondary Cell or a Non-Aqueous Electrolyte Electric Double Layer Capacitor>

An additive for a non-aqueous electrolyte secondary cell or a non-aqueous electrolyte electric double layer that at least contains one of tautomers of phosphazene derivatives represented by the following formulae (1) and (2), and, if necessary, other component:

formula (1):

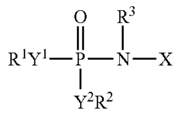

formula (2):

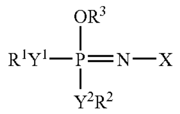

However, $R^1$, $R^2$ and $R^3$ independently represent a monovalent substituent or a halogen element, X represents a substituent containing at least one selected from a group of carbon, silicon, germanium, tin, nitrogen, phosphorus, arsenic, antimony, bismuth, oxygen, sulfur, selenium, tellurium and polonium, and $Y^1$ and $Y^2$ independently represent a divalent connecting group, a divalent element or a single bond.

It is necessary for the additives for the non-aqueous electrolyte secondary cell or the non-aqueous electrolyte electric double layer capacitor to contain the tautomers for the following reasons, and it is also preferable to contain other component such as the phosphazene derivatives represented by formula (2) and the like.

Namely, in an electrolyte in which a conventional aprotic organic solvent is a base, when a large current is suddenly flown into the electrolyte during a short circuit or the like, and the cell or the capacitor generates an excessive amount of heat, it is risky because a case may occur in which the electrolyte is evaporated or decomposed to generate gas, and due to the generated gas, the cell is exploded and ignited.

On the other hand, when the tautomer, the phosphazene derivative or the like is contained in these conventional non-aqueous electrolytes, excellent self-extinguishability or flame retardancy is imparted and thus the risks described above is preferably reduced by the action of nitrogen gas or halogen gas induced from the tautomer and the phosphazene derivative. Further, phosphorus acts to suppress chain-decomposition of high polymer materials for structuring the cell or the capacitor, and effectively imparts excellent self-extinguishability and flame retardancy to the non-aqueous electrolyte.

In ester-based electrolytes as electrolytes of a conventional non-aqueous electrolyte secondary cell, it is considered that corrosion of the secondary cell occurs and proceeds due to a $PF_5$ gas generated when, for example, a lithium ion source such as an $LiPF_6$ salt as a supporting salt decomposes into LiF and $PF_5$ as time goes by, or due to a hydrogen fluoride gas that is generated when the generated $PF_5$ gas further reacts with water or the like. Thus, a phenomenon in which not only conductivity of the non-aqueous electrolyte deteriorates, but also electrode materials deteriorate due to the generation of the hydrogen fluoride gas. Similarly, also in a conventional non-aqueous electrolyte electric double layer capacitor, it is considered that compounds generated due to decomposition or reaction of the electrolyte or the supporting salt in the non-aqueous electrolyte cause electrodes and peripheral materials of the electrodes to corrode. Further, it is also considered that, since the amount of the supporting salt itself decreases due to the decomposition or the reaction, electric characteristics are damaged, resulting in deterioration of the performance of the capacitor.

On the contrary, the tautomer, the phosphazene derivative and the like contribute to suppress decomposition or reaction of the electrolytes or the supporting salt and stabilize the same. (The tautomer, the phosphazene derivative and the like effectively act on a $PF_6$ salt, for example, a lithium ion source such as the $LiPF_6$.) Accordingly, the addition of the tautomer and the phosophazene derivative represented by formula (2) to the conventional electrolyte can suppress decomposition reaction of the non-aqueous electrolyte to thereby preferably suppress corrosion or deterioration thereof.

Moreover, the additive disclosed in the present invention include a tautomer. The tautomer is that of the phosphazene derivative represented by formula (2). When the tautomer is contained in the non-aqueous electrolyte, it can exhibit extremely excellent low-temperature characteristics.

<Molecular Structure of the Tautomer>

The molecular structure of the tautomer is as described below.

In formula (1), $R^1$, $R^2$ and $R^3$ are not particularly limited as long as they independently represent a monovalent substituent or a halogen element. Examples of monovalent substituents include an alkoxy group, an alkyl group, a carboxyl group, an acyl group and an aryl group. Preferable examples of halogen elements include fluorine, chlorine, and bromine. Among these, from the viewpoint of low-temperature characteristics and electrochemical stability of the non-aqueous electrolyte, fluorine and an alkoxy group are particularly preferable. Further, from the viewpoint of the lowering of viscosity of the non-aqueous electrolyte, fluorine, an alkoxy group, and a fluorine-containing alkoxy group are preferable. All of $R^1$, $R^2$ and $R^3$ may comprise the same substituent or different substituents.

Examples of the alkoxy group include: a methoxy group, an ethoxy group, a propoxy group and a butoxy group; or alkoxy groups substituted by alkoxy groups such as a methoxyethoxy group and a methoxyethoxyethoxy group. Among these, it is preferable that all of $R^1$, $R^2$ and $R^3$ comprise a methoxy group, an ethoxy group, a methoxyethoxy group or a methoxyethoxyethoxy group, and it is particularly preferable from the viewpoint of low viscosity and high dielectric constant that all of $R^1$, $R^2$ and $R^3$ comprise a methoxy group or an ethoxy group.

Examples of the alkyl groups include a methyl group, an ethyl group, a propyl group, a butyl group, and a pentyl group.

Examples of the acyl group include a formyl group, an acetyl group, a propionyl group, a butyryl group, an isobutyryl group, and a valeryl group.

Examples of the aryl group include a phenyl group, a tolyl group, and a naphthyl group.

It is preferable to substitute hydrogen elements in these substituents with the aforementioned halogen elements.

In formula (1), examples of groups represented by $Y^1$ and $Y^2$ include, other than a $CH_2$ group, groups containing elements such as oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among these, the $CH_2$ group, and groups containing elements such as oxygen, sulfur, selenium and nitrogen are preferable. From a viewpoint of the improvement of flame retardancy, groups containing elements of sulfur and oxygen are particularly preferable. Further, from a viewpoint that the non-aqueous electrolyte has excellent low-temperature characteristics, groups containing an oxygen element are particularly preferable. $Y^1$ and $Y^2$ can be the same or different.

In formula (1), from a viewpoint of taking harmfulness and influence on environment into consideration, X is preferably a substituent containing at least one element selected from a group of carbon, silicon, nitrogen, phosphorus, oxygen and sulfur, and more preferably, a substituent having structures represented by formula (3) described below:

Formula (3):

Substituent (A)

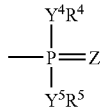

Substituent (B)

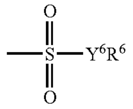

Substituent (C)

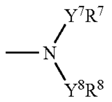

However, in formula (3), $R^4$ to $R^8$ independently represent a monovalent substituent or a halogen element. $Y^4$ to $Y^8$ independently represent a divalent connecting group, a divalent element or a single bond, and Z represents a divalent group or a divalent element.

In formula (3), preferable examples of $R^4$ to $R^8$ can include the same monovalent substituents or halogen elements as those described about $R^1$ to $R^3$ in formula (1). Further, $R^4$ to $R^8$ can be the same or different in the same substituent. $R^4$ and $R^5$, and $R^7$ and $R^8$ may be bonded to each other to form a ring.

In formula (3), examples of groups represented by $Y^4$ to $Y^8$ can include divalent connecting groups or divalent groups that are the same as those described about $Y^1$ to $Y^2$ in formula (1). Similarly, from the viewpoint of improvement of flame retardancy of the non-aqueous electrolyte, it is particularly preferable for the groups represented by $Y^4$ to $Y^8$ to contain elements such as sulfur and oxygen. From the viewpoint that the non-aqueous electrolyte has excellent low-temperature characteristics, it is also particularly preferable for $Y^4$ to $Y^8$ to contain an oxygen element. These can be the same or different in the same substituent.

In formula (3), other than a $CH_2$ group, a CHR group (in which R represents an alkyl group, an alkoxyl group or a phenyl group, and hereinafter, the same), and an NR group, examples of Z include: groups containing elements such as oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among these, it is preferable that Z contains, other than the $CH_2$ group, the CHR group, and the NR group, elements such as oxygen, sulfur and selenium. Especially, from a viewpoint of the increase of flame retardancy of the non-aqueous electrolyte, it is preferable that Z includes elements such as sulfur and selenium. Further, from a viewpoint of excellent low-temperature characteristic of the non-aqueous electrolyte, it is particularly preferable that Z includes an oxygen element.

In formula (3), as a substituent, a substituent containing phosphorus as represented by the substituent (A) is particularly preferable in that it can effectively impart self-extinguishability or flame retardancy to the non-aqueous electrolyte. Further, in the substituent (A), particularly if each of Z, $Y^4$ and $Y^5$ is an oxygen element, it becomes possible for the non-aqueous electrolyte to exhibit extremely excellent low-temperature characteristics. Moreover, if the substituent is a sulfur-containing substituent represented by the substituent (B), it is particularly preferable in that small interface resistance of the non-aqueous electrolytes can be reduced.

$R^1$ to $R^8$, $Y^1$, $Y^2$, $Y^4$ to $Y^8$ and Z in the aforementioned formulae (1) to (3) are appropriately selected, such that it becomes possible to synthesize a non-aqueous electrolyte having more preferable viscosity, solubility appropriate for adding or mixing, low-temperature characteristics, and the like. These compounds can be used alone or in combination.

It is preferable that the molecular structure of the tautomer and the phosphazene derivative represented by formula (2) includes a substituent containing a halogen element. As the halogen element, fluorine, chlorine, and bromine are preferable, and fluorine is particularly preferable.

When the halogen element-containing substituent is contained in the molecular structure, even when the content of the substance in the molecular structure is small, the non-aqueous electrolyte can effectively exhibit self-extinguishability or flame-retardancy due to a halogen gas generated from the halogen element. In a compound having a halogen element-containing substituent, there is often caused a problem about the formation of halogen radicals. However, with the tautomer and the phosphazene derivative, such a problem is not caused because a phosphorus element in its molecular structure captures halogen radicals and forms stable halogenated phosphorus.

A content of the halogen element in the tautomer and the phosphazene derivative is preferably 2 to 80 wt %, and more preferably 2 to 60 wt %, and most preferably 2 to 50 wt %.

When the content of the halogen element in the tautomer and the phosphazene derivative is less than 2 wt %, the non-aqueous electrolyte does not sufficiently exhibit the effect of the halogen element contained in the tautomer and the phosphazene derivative. On the other hand, when the content exceeds 80 wt %, the viscosity of the halogen element becomes higher. Accordingly, when the halogen element is contained in the non-aqueous electrolyte, it may deteriorate the conductivity of the non-aqueous electrolyte.

The tautomer is that of the phosphazene derivative represented by formula (2), and can be made by controlling the vacuum level and/or the temperature when the phosphazene derivative represented by formula (2) is produced.

Further, the content (vol %) of a tautomer in a non-aqueous electrolyte can be measured by a measuring method described below.

<Measuring Method>

A peak area of a sample is determined by a gel permeation chromatography (GPC) or a high-speed liquid chromatography. The content of the tautomer can be measured such that the determined peak area is compared with an area per mol of the tautomer that has been predetermined to obtain a mol ratio. The mol ratio is further volume-converted in consideration of a specific gravity.

<Molecular Structure of the Phosphazene Derivative Represented by Formula (2)>

As the phosphazene derivative represented by formula (2), a photophazene derivative whose viscosity is comparatively low and which is able to dissolve a supporting salt satisfactorily. Examples of $R^1$ to $R^3$, $Y^1$ to $Y^3$ and X in formula (2) can use almost the same examples described in formula (1).

<Flash Point of the Phosphazene Derivative Represented by Formula (2)>

The flash point of the phosphazene derivative represented by formula (2) is not particularly limited. However, from the viewpoint of suppression of ignition, the flash point is preferably 100° C. or more and more preferably 150° C. or more.

If the flash point is 100° C. or more, ignition or the like of the cell can be suppressed, and if ignition or the like occurs inside a cell, a risk can be reduced at which the cell is ignited and combusted to spread over the surface of the electrolyte.

The “flash point” specifically refers to a temperature at which flame spreads over the surface of a substance and covers 75% thereof. The flash point can be a criterion to see a tendency at which a mixture that is combustible with air is formed. In the present invention, a value measured by a “Mini-flash” method described below is used. Namely, an apparatus (i.e., an automatic ignition measuring device, MINIFLASH manufactured by GRABNER INSTRUMENTS Inc.) comprising a small measuring chamber (4 ml), a heating cup, a flame, an ignition portion and an automatic flame sensing system is prepared in a sealed cup method. A sample to be measured (1 ml) was put into the heating cup. This heating cup is covered with a cover. The heating cup is heated from the upper portion of the cover. Hereinafter, the temperature of the sample is arisen at a constant interval, a mixture of vapor and air in the cup is ignited at a constant interval of temperature, and ignition is detected. The temperature when ignition is detected is regarded as a flash point.

As an amount in which the additive of the present invention is added, it is preferable that the amount and a preferable range of values of the content of the tautomer and the phosphazene derivative represented by formula (2) in a non-aqueous electrolyte secondary cell/a non-aqueous electrolyte electric double layer capacitor later described are almost the same. The amount of the additive of the present invention is controlled to a value within the aforementioned range to thereby provide the non-aqueous electorlyte with the effects of the invention such as excellent self-extinguishability or flame retardancy, excellent deterioration resistance, and low-temperature characteristics.

The addition of the additive to a non-aqueous electrolyte secondary cell/a non-aqueous electrolyte electric double layer capacitor can make the non-aqueous electrolyte secondary cell/the non-aqueous electrolyte electric double layer capacitor which are excellent in self-extinguishability or flame retardancy, and deterioration resistance, and which exhibit low temperature characteristics and low interface resistance of a non-aqueous electrolyte, while maintaining electric characteristics and cell properties required for the capacitor and the cell.

<Non-aqueous Electrolyte Secondary Cell>

The non-aqueous electrolyte secondary cell of the present invention comprises an anode, a cathode, and a non-aqueous electrolyte, and if necessary, other member.

<Anode>

Materials for anodes are not particularly limited, and can be appropriately selected from any known anode materials, and used. Preferable examples of anode materials include: metal oxides such as $V_2O_5$, $V_6O_{13}$, $MnO_2$, $MoO_3$, $LiCoO_2$, $LiNiO_2$, and $LiMn_2O_4$; metal sulfides such as $TiS_2$ and $MoS_2$; and conductive polymers such as polyaniline. Among these, $LiCoO_2$, $LiNiO_2$ and $LiMn_2O_4$ are preferable because they are safe, have high capacity, and are excellent in wettability with respect to electrolytes. The materials can be used alone or in combination.

Configuration of the anodes is not particularly limited, and can be preferably selected from known configurations as electrodes, such as sheet, solid-cylindrical, plate and spiral-shaped configurations.

<Cathode>

Materials for a cathode are not particularly limited as long as they can absorb and discharge lithium or lithium ions. The cathode can be selected appropriately from known cathode materials, and used. Preferable examples of cathode materials include those containing lithium therein such as lithium metal itself; alloys of lithium and aluminum, indium, lead or zinc; and a carbon material such as lithium-doped graphite. Among these materials, a carbon material such as graphite is preferable from the viewpoint of high safety. These materials can be used alone or in combination.

Configuration of a cathode is not particularly limited, and can appropriately be selected from known configurations in the same manner as those of the above-described anodes.

<Non-aqueous Electrolyte>

A non-aqueous electrolyte contains the additive for the non-aqueous electrolyte secondary cell of the present invention and a supporting salt and, and other components if necessary.

<Supporting Salt>

As a supporting salt, ion sources of lithium ions are preferable. ion sources of the lithium ions such as $LiCl_4$, $LiBF_4$, $LiPF_6$, $LiCF_3SO_3$, $LiAsF_6$, $LiC_4F_9SO_3$, $Li(CF_3SO_2)_2N$, and $Li(C_2F_5SO_2)_2N$ can preferably be used. These can be used alone or in combination.

An amount in which the supporting salt is contained in the non-aqueous electrolyte (solvent component) (1 kg) is preferably 0.2 to 1 mol, and more preferably 0.5 to 1 mol.

If the amount in which the supporting salt is contained in the non-aqueous electrolyte is less than 0.2 mol, sufficient conductivity of the non-aqueous electrolyte cannot be secured. Therefore, a case may be caused in which charging/discharging characteristics of cells are damaged. Meanwhile, if the amount in which the supporting salt is contained in the non-aqueous electrolyte is more than 1 mol, viscosity of the non-aqueous electrolytes increases, sufficient mobility of the lithium ion or the like cannot be secured, and sufficient conductivity of the non-aqueous electrolytes cannot be secured as in the above-description. Therefore, a case may be caused in which charging/discharging characteristics of the cells are damaged.

<Additive for a Non-aqueous Electrolyte Secondary Cell>

The additive for the non-aqueous electrolyte secondary cell is the same as that in the description about the additive disclosed in the present invention, and contain therein the tautomer.

<Viscosity of a Non-aqueous Electrolyte of a Non-aqueous Electrolyte Secondary Cell>

Viscosity of the non-aqueous electrolyte of the non-aqueous electrolyte secondary cell at 25° C. is preferably 10 mPa·s (10 cP) or less, and more preferably 5 mPa·s (5 cP) or less.

If the viscosity is 10 mPa·s (10 cP) or less, the non-aqueous electrolyte secondary cell with excellent cell properties such as low internal resistance, high conductivity and the like can be made.

Viscosity is measured for 120 minutes at each of rotational speeds of 1 rpm, 2 rpm, 3 rpm, 5 rpm, 7 rpm, 10 rpm, 20 rpm and 50 rpm by a viscometer (product name: R-type viscometer Model RE500-SL, manufactured by Toki Sangyo K.K.) and determined on the basis of the rotational speed as an analysis condition at which the value indicated by the viscometer reached 50 to 60%.

<Content of the Non-aqueous Electrolyte Secondary Cell>

Depending upon the effects obtained by containing the tautomer and the phosphazene derivative in the non-aqueous electrolyte, a total amount of the tautomer and the phosphazene derivative represented by formula (2) in the non-aqueous electrolyte is classified into four types of contents including: a first content that enables the non-aqueous electrolyte to exhibit more suitable "low-temperature characteristics"; a second content that enables the non-aqueous electrolyte to exhibit more suitable "self-extinguishability"; a third content that enables the non-aqueous electrolyte to exhibit more suitable "flame retardancy"; and a fourth content that enables the non-aqueous electrolyte to exhibit more suitable "deterioration resistance".

From the viewpoint of the "low-temperature characteristics", the first content of the tautomer and the phosphazene derivative represented by formula (2) in the non-aqueous electrolyte is preferably 1 vol % or more, more preferably 2 vol % or more, and most preferably 5 vol % or more.

When the first content is less than 1 vol %, it becomes impossible to lower the freezing point of a non-aqueous electrolyte sufficiently, thus making it impossible to obtain enough low-temperature characteristics.

Further, the "low-temperature characteristics" are measured and evaluated due to the evaluation of the low-temperature characteristics described below. Namely, cells are charged at 20° C. under the conditions of a maximum voltage of 4.5V, a minimum voltage of 3.0V, and a charging current of 50 mA. Thereafter, charging/discharging in which a discharging current of 100 mA is discharged is repeated to 50 cycles at low temperatures (such as 0° C., −10° C., and −20° C.). The discharging capacity at low temperature at this time is compared with that measured at 20° C. to calculate a discharging capacity remaining ratio by the following equation (2). Similarly, the discharging capacity remaining ratio is measured and calculated with respect to total three cells to determine a mean value. Accordingly, low-temperature characteristics are evaluated.

discharging capacity remaining ratio=discharging capacity at low temperature/discharging capacity (20° C.)×100(%)    Equation (2)

From the viewpoint of the "self extinguishability", the second content of the tautomer and the phosphazene derivative represented by formula (2) in the non-aqueous electrolyte is preferably 20 vol % or more.

When the content is less than 20 vol %, the non-aqueous electrolyte is not provided with sufficient "self-extinguishability".

In an evaluation method of self-extinguishability described below, "self-extinguishability" means characteristics in which ignited flame extinguishes at a 25 to 100 mm-height of flame line and enters a state in which no ignition of fallen residues is found.

From the viewpoint of the "flame retardancy", the third content of the tautomer and the phosphazene derivative represented by formula (2) in the non-aqueous electrolyte is preferably 30 vol % or more.

When the content is 30 vol % or more, it enables the non-aqueous electrolyte to exhibit sufficient "flame retardancy".

Further, in an evaluation method of "flame retardancy" described below, "flame retardancy" means characteristics that the ignited flame does not reach a 25 mm-height of flame line and enters a state in which no ignition of fallen residues is found.

The self-extinguishability and flame retardancy follow a method in which a UL94HB method of UL (Under Lighting Laboratory) standards was arranged. Namely, the self-extinguishability and flame retardancy were evaluated by measuring a combustion behavior of flame ignited under an ambient air, more specifically, on the basis of UL test standards, such that various types of electrolytes (1.0 ml) were immersed in an incombustible quartz fiber and test pieces (127 mm×12.7 mm) are prepared, and ignitability, flammability, and formation of carbide, and phenomenon during a secondary ignition were observed.

From the viewpoint of the "self-extinguishability or flame retardancy", a non-aqueous electrolyte comprising the tautomer, the phosphazene derivative represented by formula (2), $LiPF_6$, ethylene carbonate and/or propylene carbonate, and that comprising the tautomer, the phosphazene derivative represented by formula (2), $LiCF_3SO_3$, and propylene carbonate are particularly preferable. In these non-aqueous electrolytes, in spite of the above-description, even if the content of the phosphazene derivative in the non-aqueous electrolyte is small, the non-aqueous electrolyte provides effects of excellent self-extinguishability or flame retardancy. Namely, in order for the non-aqueous electrolyte to develop self-extinguishability, the content is preferably 1.5 to 2.5 vol %. In order for the non-aqueous electrolyte to develop flame retardancy, the content is preferably 2.5 vol % or more.

From the viewpoint of the "deterioration resistance", the fourth content of the tautomer and the phosphazene derivative represented by formula (2) in the non-aqueous electrolyte is preferably 2 vol % or more, and more preferably 3 to 75 vol %. Further, in order for the non-aqueous electrolyte to satisfy high level of deterioration resistance and low-temperature characteristics, the content of 5 to 75 vol % is more preferable.

If the content is within the aforementioned range of values, deterioration can suitably be suppressed.

"Deterioration" refers to decomposition of a supporting salt (for example, lithium salt), and effects due to prevention of the deterioration were evaluated by an evaluation method of stability described below.

(1) First, the non-aqueous electrolyte containing a supporting salt is prepared. Thereafter, moisture content of this is measured. Then, concentration of a hydrogen fluoride in the non-aqueous electrolyte is measured by a high performance liquid chromatography (ion chromatography). Further, hues of the non-aqueous electrolyte are visually observed. Thereafter, charging/discharging capacity is calculated by a charging/discharging test.

(2) The non-aqueous electrolyte is left in a gloved box for 2 months. Thereafter, moisture content and concentration of a hydrogen fluoride are measured again, hues are visually observed, and charging/discharging capacity is calculated. In accordance with variations of the obtained values, stability of the non-aqueous electrolyte is evaluated.

<Other Component>

As the other component, an aprotic organic solvent and the like are particularly preferable in respect of safety.

If an aprotic organic solvent is contained in the non-aqueous electrolyte, since the aprotic organic solvent never react with the above-described cathode materials, high safety can be ensured, and the lowering of viscosity of the non-aqueous electrolyte is enabled, thereby facilitating the non-aqueous electrolyte to easily attain optimum ionic conductivity as the non-aqueous electrolyte secondary cell.

Examples of the aprotic organic solvents are not particularly limited, but include: ether compounds and ester compounds from the viewpoint of the lowering of viscosity of the non-aqueous electrolyte, and specific examples thereof include: 1,2-dimethoxyethane, tetrahydrofuran, dimethyl carbonate, diethyl carbonate, diphenyl carbonate, ethylene carbonate, propylene carbonate, γ-butyrolactone, γ-valerolactone, and methyl ethyl carbonate.

Among these, cyclic ester compounds such as ethylene carbonate, propylene carbonate, and γ-butyrolactone, chain ester compounds such as 1,2-dimethoxyethane, dimethyl carbonate, ethyl methyl carbonate, and diethyl carbonate are preferable. The cyclic ester compounds are preferable in that they have high relative dielectric constants and can dissolve easily lithium salts or the like, and the chain ester compounds are preferable in that they have low viscosity, and are able to lower the viscosity of the non-aqueous electrolyte. These can be used alone. However, use of two or more of these in combination is preferable.

<Viscosity of an Aprotic Organic Solvent>

Viscosity of the aprotic organic solvent at 25° C. is preferably 10 mPa·s (10 cP) or less, and more preferably 5 mPa·s (5 cP) or less in order to easily lower the viscosity of the non-aqueous electrolyte.

<Other Member>

As other member, a separator that is interposed between a cathode and an anode in order to prevent a short circuit of electric currents by both the cathode and anode contacting to each other, and known members generally used in cells are preferably used.

Examples of materials for separators include materials which are able to reliably prevent both electrodes from contacting each other and to include electrolytes therein or flow the same therethrough. Specific examples of the materials include: synthetic resin non-woven fabrics such as polytetrafluoroethylene, polypropylene, and polyethylene, thin films, and the like. Among these, use of a micro-porous polypropylene or polyethylene film having a thickness of from 20 to 50 μm is particularly preferable.

<Internal Resistance of a Non-aqueous Electrolyte Secondary Cell>

An internal resistance (Ω) of a non-aqueous electrolyte secondary cell can easily have a preferable value due to the control of the viscosity of the non-aqueous electrolyte to the aforementioned preferable range of values. The internal resistance (Ω) is preferably 0.1 to 0.3 (Ω), and more preferably 0.1 to 0.25 (Ω).

The internal resistance can be obtained by a known method such as the method described below in which internal resistance is measured. Namely, when the non-aqueous electrolyte secondary cell is made and charging/discharging curves are measured, the internal resistance can be obtained by a deflection width of potentials in accordance with charging rest or discharging rest.

<Capacity of a Non-aqueous Electrolyte Secondary Cell>

When $LiCoO_2$ is an anode, the capacity (charging/discharging capacity) (mAh/g) of the non-aqueous electrolyte secondary cell is preferably 140 to 145 (mAh/g), and more preferably 143 to 145 (mAh/g).

A known method is used for measuring the charging/discharging capacity, such as the one in which a charging/discharging test is carried out by using a semi-open type cell or a closed type coin cell (See Masayuki Yoshio, "Lithium ion secondary cell" published by Nikkan Kogyo Shinbunsha), whereby a capacity is determined by charging current (mA), time (t) and weight of an electrode material (g).

<Shape of a Non-aqueous Electrolyte Secondary Cell>

The shape of a non-aqueous electrolyte secondary cell is not particularly limited and is suitably formed into various known configurations such as a coin-type cell, a button-type cell, a paper-type cell, a square-type cell and a cylindrical cell having a spiral structure.

In the case of the spiral structure, a sheet type anode is prepared to sandwich a collector, and a (sheet type) cathode is superimposed on this, and rolled up, whereby a non-aqueous electrolyte secondary cell can be prepared.

<Performance of a Non-aqueous Electrolyte Secondary Cell>

The non-aqueous electrolyte secondary cell of the present invention is excellent in deterioration resistance, has the non-aqueous electrolyte with low interface resistance, and has low internal resistance to thereby increase conductivity, and is also excellent in low-temperature characteristics.

<Non-aqueous Electrolyte Electric Double Layer Capacitor>

The non-aqueous electrolyte electric double layer capacitor of the present invention comprises an anode, a cathode, a non-aqueous electrolyte, and, if necessary, other member.

<Anode>

Materials for an anode of non-aqueous electrolyte electric double layer capacitors are not particularly limited. However, use of carbon based-polarizable electrodes is generally preferable. As the polarizable electrodes, it is preferable to use electrodes in which specific surface and/or bulk concentration thereof are large, which are electro-chemically inactive, and which have a low resistance.

The polarizable electrodes are not particularly limited. However, the polarizable electrodes generally contain an activated carbon, and if necessary, other component such as a conductive agent or a binder.

<Activated Carbon>

Raw materials for an activated carbon are not particularly limited, and typical examples thereof include phenol resins, other components such as various types of heat-resistant resins, pitches, and the like.

Preferable examples of the heat-resistant resins include: polyimide, polyamide, polyamideimide, polyether, polyetherimide, polyetherketone, bismaleicimidetriazine, aramide, fuluoroethylene resin, polyphenylene, polyphenylene sulphide, and the like. These resins can be used alone or in combination.

It is preferable that an activated carbon used for the anode is formed in powders, fibers, and the like in order to increase the specific surface area of the electrode and increase the charging capacity of the non-aqueous electrolyte electric double layer capacitor.

Further, the activated carbon may be subjected to a heat treatment, a drawing treatment, a vacuum treatment at high temperature, and a rolling treatment for a purpose to increase the charging capacity of the non-aqueous electrolyte electric double layer capacitor.

<Other Component (Conductive Agent and Binder)>

The conductive agent is not particularly limited, but graphite and acetylene black and the like can be used.

Materials of the binder are not particularly limited, but resins such as polyvinylidene fluoride and tetrafluoroethylene can be used.

<Cathode>

As a cathode, polarizable electrodes similar to those for the anode can preferably be used.

<Non-aqueous Electrolyte>

The non-aqueous electrolyte contains an additive for the non-aqueous electrolyte electric double layer capacitor, a supporting salt, and, if necessary, other component.

<Supporting Salt>

A supporting salt can be selected from those that are conventionally known. However, use of a quaternary ammonium salt, which can provides excellent electric characteristics such as electric conductivity and the like in the non-aqueous electrolyte, is preferable.

The quaternary ammonium salt is required to be a quaternary ammonium salt that is able to form a multivalent ion, in that the quaternary ammonium salt is a solute which acts as an ion source for forming an electric double layer in the non-aqueous electrolyte, and is also able to effectively increase electric characteristics such as electric conductivity of the non-aqueous electrolyte.

Examples of the quaternary ammonium salts include: $(CH_3)_4N.BF_4$, $(CH_3)_3C_2H_5N.BF_4$, $(CH_3)_2(C_2H_5)_2N.BF_4$, $CH_3(C_2H_9)_4N.BF_4$, $(C_2H_5)_4N.BF_4$, $(C_3H_7)_4N.BF_4$, $CH_3(C_4H_9)_3N.BF_4$, $(C_4H_9)_4N.BF_4$, $(C_6H_{13})_4N.BF_4$, $(C_2H_5)_4N.ClO_4$, $(C_2H_5)_4N.BF_4$, $(C_2H_5)_4N.PF_6$, $(C_2H_5)_4N.AsF_6$, $(C_2H_5)_4N.SbF_6$, $(C_2H_5)_4N.CF_3SO_3$, $(C_2H_5)_4N.C_4F_9SO_3$, $(C_2H_5)_4N.(CF_3SO_2)_2N$, $(C_2H_5)_4N.BCH_3(C_2H_5)_3$, $(C_2H_5)_4N.B(C_2H_5)_4$, $(C_2H_5)_4N.B(C_4H_9)_4$, $(C_2H_5)_4N.B(C_6H_5)_4$ and the like. Further, a hexafluorophosphate of the quaternary ammonium salt may be used. Moreover, solubility can be improved by increasing polarizability. Therefore, a quaternary ammonium salt can be used in which different alkyl groups are bonded to an N atom.

Examples of the quaternary ammonium salt include compounds represented by the following structural formulae (1) to (10):

Structural formula (1)

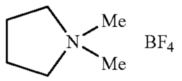

-continued

Structural formula (2)

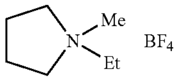

Structural formula (3)

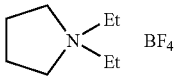

Structural formula (4)

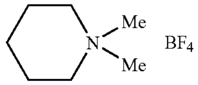

Structural formula (5)

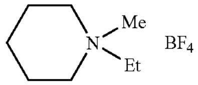

Structural formula (6)

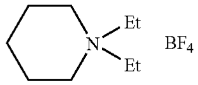

Structural formula (7)

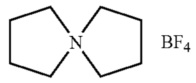

Structural formula (8)

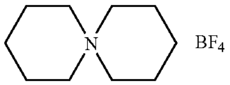

Structural formula (9)

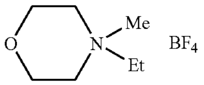

Structural formula (10)

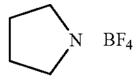

In the above-described structural formulae, Me represents a methyl group, and Et represents an ethyl group.

Among these quaternary ammonium salts, salts which are able to generate $(CH_3)_3N^+$ or $(C_2H_5)_4N^+$ as positive ions are preferable in that high electric conductivity can be secured. Further, salts which are able to generate negative ions whose formula weight is small are preferable.

These quaternary ammonium salts can be used alone or in combination.

The amount of the supporting salt in the non-aqueous electrolyte (solvent component) (1 kg) is preferably 0.2 to 1.5 mol, and more preferably 0.5 to 1 mol.

If the amount of the supporting salt in the non-aqueous electrolyte is less than 0.2 mol, there is a case in which electric characteristics such as sufficient electric conductivity of the non-aqueous electrolyte can be secured. On the other hand, if the amount of the supporting salt in the non-aqueous electrolyte exceeds 1.5 mol, there is a case in which viscosity of the non-aqueous electrolyte increases and electric characteristics such as electric conductivity decrease.

<Additive for a Non-aqueous Electrolyte Electric Double Layer Capacitor>

The additive for the non-aqueous electrolyte electric double layer capacitor is the same as the description about the additive disclosed in the present invention.

<Viscosity of a Non-aqueous Electrolyte of a Non-aqueous Electrolyte Electric Double Layer Capacitor>

The viscosity of the non-aqueous electrolyte of the non-aqueous electrolyte electric double layer capacitor at 25° C. has the same optimum condition and analysis condition as those in the above-description about the viscosity of the non-aqueous electrolyte of the non-aqueous electrolyte secondary cell.

<Conductivity of a Non-aqueous Electrolyte Electric Double Layer Capacitor>

The conductivity of the non-aqueous electrolyte is preferably 2.0 mS/cm or more and more preferably 5.0 to 30 mS/cm in a quaternary ammonium salt solution (0.5 mol/1).

If the conductivity is 2.0 mS/cm or more, sufficient conductivity of the non-aqueous electrolyte can be secured thus making it possible to suppress internal resistance of the non-aqueous electrolyte electric double layer capacitor, and also control ascent/descent of potentials thereof during charging/discharging.

The conductivity is a value obtained through a measuring method described below. Namely, the conductivity is measured under predetermined conditions (temperature: 25° C., pressure: normal pressure, and moisture percentage: 10 ppm or less) by using a conductivity meter (CDM210 type manufactured by Radio Meter Trading Co., Ltd.), while applying a constant current of 5 mA to the non-aqueous electrolyte secondary cell.

Theoretically, at first, a conductance (Gm) of a non-aqueous electrolyte is calculated. From this, an influence by a cable resistance (R) is removed to determine a conductance (G) of the electrolyte itself. Accordingly, a conductance K=G·K (S/cm) can be determined from the obtained value (G) and the cell constant (K) already known.

<Content of an Additive in a Non-aqueous Electrolyte Electric Double Layer Capacitor>

A total amount of the tautomer and the phosphazene derivative represented by formula (2) in the non-aqueous electrolyte correspond to quantity, analysis, and evaluation conditions of the above-description about the content of the additive for the non-aqueous electrolyte secondary cell.

"Low-temperature characteristics" in the non-aqueous electrolyte electric double layer capacitor can be evaluated such that internal resistances (Ω) are measured at 0° C., −5° C., and −10° C., respectively, and each of the internal resistances was compared with the internal resistance (Ω) measured at 20° C.

<Other Component>

As other component that those descirbed above, an aprotic organic solvent or the like is particularly preferable from the viewpoint of safety.

Preferable examples and viscosity of the aprotic organic solvents are the same as in the description about those of the aprotic organic solvent that can be used in the non-aqueous electrolyte secondary cell.

<Other Member>

Examples of other member can include a separator, a collector and a container.

The separator is interposed between a cathode and an anode in order to prevent a short-circuit of the non-aqueous electrolyte electric double layer capacitor. The separator is not particularly limited, and known separator can preferably be used for the non-aqueous electrolyte electric double layer capacitors.

As the materials for separators, microporous film, nonwoven fabric and paper can preferably be used, and specific examples thereof include: nonwoven fabrics, thin film layers and the like made from synthetic resins such as polytetrafluoroethylene, polypropylene, polyethylene and the like. Among these, polypropylene or polyethylene microporous film having a thickness of about 20 to 50 μm is particularly preferable.

The collector is not particularly limited, and known collectors which are ordinarily used for non-aqueous electrolyte electric double layer capacitors are preferably used. Collectors are preferable which have excellent electrochemical corrosion resistance, chemical corrosion resistance, workabilty, and mechanical strength, and which can be manufactured inexpensively, and preferable examples thereof include aluminum, stainless steel, conductive resins, and the like.

The container is not particularly limited, and conventionally known containers for the non-aqueous electrolyte electric double layer capacitors are preferably used.

Materials such as aluminum, stainless steel, conductive resin and the like are preferably used for the containers.

As the other member than the separator, collector and container, each of known members which are generally used for non-aqueous electrolyte electric double layer capacitors are preferably used.

<Internal Resistance of a Non-aqueous Electrolyte Electric Double Layer Capacitor>

The internal resistance (Ω) of the non-aqueous electrolyte electric double layer capacitor has the same conditions of resistance value and conditions of measurement as the description about those of the internal resistance (Ω) of the non-aqueous electrolyte secondary cell.

<Configuration and Use of a Non-aqueous Electrolyte Electric Double Layer Capacitor>

Configuration of the non-aqueous electrolyte electric double layer capacitors are not particularly limited, and conventionally known configurations such as cylinder-type (cylindrical or square) or flat-type (coin) are preferably used.

The non-aqueous electrolyte electric double layer capacitors are preferably used for power supplies for memory back-ups of various electronic devices, industrial apparatuses, and aeronautical apparatuses; electric magnetic holders for toys, cordless apparatuses, gas apparatuses, and instant boilers; and clocks such as wrist watch, a wall clock, a solar clock, and an AGS (automatic gain stabilization) wrist watch.

<Performance of a Non-aqueous Electrolyte Electric Double Layer Capacitor>

The non-aqueous electrolyte electric double layer capacitor of the present invention is excellent in deterioration resistance, and has high conductivity because interface resistance of the non-aqueous electrolyte is low and internal resistance is thereby low, and is also excellent in low temperature characteristics.

EXAMPLES

With reference to Examples and Comparative Examples, more detailed description of the present invention will be given hereinafter. The present invention is not limited to Examples described below:

<Non-aqueous Electrolyte Secondary Cell>

Example 1

Preparation of a Non-aqueous Electrolytes for Non-aqueous Electrolyte Secondary Cell To 49 ml of a mixed solvent of diethyl carbonate and ethylene carbonate (mixture ratio (i.e., volume ratio): diethyl carbonate/ethylene carbonate=1/1) (aprotic organic solvent) (2 vol %) were added 1 ml (2 vol %) of an additive for a non-aqueous electrolyte secondary cell comprising: 50 vol % of a tautomer (a compound represented by formula (1) in which X is a substituent (A) represented by formula (3), $R^1$ to $R^5$ individually represent an ethyl group, and $Y^1$ to $Y^2$, $Y^4$ to $Y^5$, and Z represent oxygen elements); and 50 vol % of a phosphazene derivative represented by formula (2) (a compound represented by formula (2) in which X is a structure of a substituent (A) represented by formula (3), $R^1$ to $R^5$ individually represent an ethyl group, and $Y^1$ to $Y^2$, $Y^4$ to $Y^5$, and Z represent oxygen elements). Further, $LiPF_6$ (supporting salt) was dissolved at concentration of 0.75 mol/kg in this mixture, whereby a non-aqueous electrolyte (viscosity at 25° C.: 3.8 mPa·s (3.8 cP) was prepared.

The additive for the non-aqueous electrolyte secondary cell was obtained by conducting superfractionation of the phosphazene derivative represented by formula (2) (a compound represented by formula (2) in which X is a structure of a substituent (A) represented by formula (3), $R^1$ to $R^5$ individually represent an ethyl group, and $Y^1$ to $Y^2$, $Y^4$ to $Y^5$, and Z represent oxygen elements) at 188° C. The content of the tautomer was determined on the basis of a peak ratio using a GPC (gel permeation chromatography) analyzer (HLC-8020 (with RI (resistance inductance) detector) manufactured by Toso Co., Ltd.) At this point, TSKgelG1000HXL and TSKgelG2000HXL (manufactured by Toso Co., Ltd.) were employed for a column, and THF (tetrahydrofuran) was developed at 1 ml/min. and used.

Evaluation of Self-extinguishability and Flame Retardancy of a Non-aqueous Electrolyte Secondary Cell The obtained non-aqueous electrolyte was evaluated as described below and in the same manner as the above-described evaluation method with respect to self-extinguishability and flame retardancy. The results are shown in table 1.

Evaluation of Flame Retardancy

A case in which ignited flame did not reach a height of 25 mm in a device, and things dropped from a net were not ignited was evaluated to have flame retardancy.

Evaluation of Self-extinguishability

A case in which ignited flame was extinguished between the heights of 25 mm and 100 mm, and things dropped from a net were not ignited was evaluated to have self-extinguishability.

Evaluation of Combustibility

A case in which ignited flame exceeded a height of 100 mm was evaluated to have combustibility.

Evaluation of Deterioration

Deterioration was evaluated with respect to the obtained non-aqueous electrolyte, in the same manner as the evaluation method of stability, by measuring and calculating moisture percentage (ppm), concentration of hydrogen fluoride (ppm), and charging/discharging capacity (mAh/g) of the non-aqueous electrolyte immediately after the non-aqueous electrolyte was prepared and after the non-aqueous electrolyte was left in a gloved box for two months. At this time, the charging/discharging capacity (mAh/g) was determined such that a charging/discharging curve was measured by a cathode whose weight has already been known, or the aforementioned anode, and the resulting value was divided by the weight of electrodes using the obtained charging/discharging amounts as described above. Further, change of hues of the non-aqueous electrolyte obtained immediately after the non-aqueous electrolyte was prepared and after the non-aqueous electrolyte was left in the gloved box for two months was visually observed.

Preparation of a Non-aqueous Electrolyte Secondary Cell

A cobalt oxide represented by chemical formula $LiCoO_2$ was used as an anode active substance. 10 parts of acetylene black (conductive assistant) and 10 parts of teflon binder (binder resin) were added to 100 parts of $LiCoO_2$. This was kneaded with an organic solvent (a mixture of ethyl acetate and ethanol in a ratio of 50 to 50 wt %). Thereafter, this was press-rolled to form a thin anode sheet (thickness: 100 μm and width: 40 mm).

Thereafter, an aluminum foil (collector), on which surface a conductive adhesive was applied and which has a thickness of 25 μm, was sandwiched by the two anode sheets thus obtained. A separator (a micro-porous polypropylene film) having a thickness of 25 μm was interposed between the two anode sheets, and a lithium metal foil having a thickness of 150 was superimposed thereon, and then rolled up to thereby make a cylindrical electrode. The cylindrical electrode has an anode length of about 260 mm.

The non-aqueous electrolyte was impregnated into the cylindrical electrode, and sealed to thereby form a size AA lithium cell.

Measurement and Evaluation of Cell Properties

After initial properties (such as voltage and internal resistance) of the cell obtained were measured and evaluated at 20° C., charging/discharging cycle performance and discharging characteristics at low temperature were measured and evaluated by a method of evaluation described below. The results are shown in table 1.

Evaluation of Charging/Discharging Cycle Performance

Charging/discharging was repeated to 50 cycles, providing that a maximum voltage was 4.5V, a minimum voltage was 3.0V, a discharging current was 100 mA, and a charging current was 50 mA. A charging/discharging capacity at this time was compared with that at the initial stage of charging/discharging, and a capacity reduction ratio after charging/discharging was repeated 50 times was calculated. Similarly, total three cells were measured and calculated to determine a mean value to thereby evaluate discharging characteristics at low temperature.

Evaluation of Discharging Characteristics at Low Temperature (Measurement of Discharging Capacity at Low Temperature)

Charging/discharging of the obtained cells was repeated to 50 cycles under the same conditions as the aforementioned "Evaluation of charging/discharging characteristics" except that discharging was conducted at low temperature (such as 0° C., −10° C., and −20° C.). A discharging capacity at such low temperature at this time was compared with that measured at 20° C. to thereby calculate a discharging capacity reduction ratio by using the equation below. Similarly, the discharging capacity reduction ratio were measured and calculated with respect to total three cells, whereby a mean value was determined to evaluate discharging characteristics at low temperature. The results are shown in table 1.

Discharging capacity reduction ratio=discharging capacity at low temperature/discharging capacity (20° C.)×100(%) Equation (2)

Example 2

Except that the amount of the mixed solvent of diethyl carbonate and ethylene carbonate (mixture ratio (i.e., volume ratio): diethyl carbonate/ethylene carbonate=1/1) (aprotic organic solvent) was changed to 48 ml, and 1 ml of the additive for a non-aqueous electrolyte secondary cell was replaced by 2 ml (4 vol %) of an additive for a non-aqueous electrolyte secondary cell comprising: 10 vol % of the tautomer (a compound represented by formula (1) in which X is a substituent (A) represented by formula (3), $R^1$ to $R^5$ individually represent an ethyl group, and $Y^1$ to $Y^2$, $Y^4$ to $Y^5$, and Z represent oxygen elements); and 90 vol % of a phosphazene derivative represented by formula (2) (a compound represented by formula (2) in which X is a structure of a substituent (A) represented by formula (3), $R^1$ to $R^5$ individually represent an ethyl group, and $Y^1$ to $Y^2$, $Y^4$ to $Y^5$, and Z represent oxygen elements) in the "Preparation of a non-aqueous electrolyte for a non-aqueous electrolyte secondary cell" in Example 1, a non-aqueous electrolyte (viscosity at 25° C.: 4.0 mPa·s (4.0 cP)) was prepared in the same manner as that in Example 1 to thereby evaluate self-extinguishability or flame retardancy, and deterioration resistance. Further, a non-aqueous electrolyte secondary cell was made in the same manner as that in Example 1, and initial cell properties (such as voltages and internal resistances), charging/discharging cycle performance, and low-temperature characteristics were respectively measured and evaluated. The results are shown in table 1.

Example 3

Except that the amount of the mixed solvent of diethyl carbonate and ethylene carbonate was changed to 35 ml, and that of the additive for the non-aqueous electrolyte secondary cell was changed to 15 ml (30 vol %) thereof, and the supporting salt was replaced by $LiBF_4$ in the "Preparation of a non-aqueous electrolytes for non-aqueous electrolyte secondary cell" in Example 1, a non-aqueous electrolyte (viscosity at 25° C.: 5.2 mPa·s (5.2 cP)) was prepared in the same manner as that in Example 1, whereby self-extinguishability or flame retardancy and deterioration resistance were evaluated. Further, a non-aqueous electrolyte secondary cell was made in the same manner as that in Example 1, and initial cell properties (such as voltage and internal resistance), charging/discharging cycle performance, low-temperature characteristics were respectively measured and evaluated. The results are shown in table 1.

Example 4

Except that the amount of the mixed solvent of diethyl carbonate and ethylene carbonate was changed to 48.5 ml, and that of the additive for a non-aqueous electrolyte secondary cell was changed to 1.5 ml (3 vol %) in the "Preparation of a non-aqueous electrolytes for a non-aqueous electrolyte secondary cell" in Example 1, a non-aqueous electrolyte (viscosity at 25° C.: 4.0 mPa·s (4.0 cP)) was prepared in the same manner as that in Example 1 to thereby evaluate self-extinguishability or flame retardancy, and deterioration resistance. Further, a non-aqueous electrolyte secondary cell was made in the same manner as that in Example 1, and initial cell properties (such as voltage and internal resistance), charging/discharging cycle performance, and low-temperature characteristics were respectively measured and evaluated. The results are shown in table 1.

Comparative Example 1

Except that the additive for the non-aqueous electrolyte secondary cell was replaced by an adidtive for a non-aqueous electrolyte secondary cell that contains a compound (100 vol %) represented by formula (2) in which X is a substituent (A) represented by formula (3), $R^1$ to $R^5$ individually represent an ethyl group, and $Y^1$ to $Y^2$, $Y^4$ to $Y^5$, and Z represent oxygen elements) in the "Preparation of a non-aqueous electrolytes for non-aqueous electrolyte secondary cell" in Example 1, a non-aqueous electrolyte (viscosity at 25° C.: 3.8 mPa·s (3.8 cP)) was prepared in the same manner as that in Example 1 to thereby evaluate self-extinguishability or flame retardancy, and deterioration resistance. Further, a non-aqueous electrolyte secondary cell was made in the same manner as that in Example 1, and initial cell properties (such as voltage and internal resistance), charging/discharging cycle performance, and low-temperature characteristics were respectively measured and evaluated. The results are shown in table 1.

Comparative Example 2

Except that the amount of the mixed solvent of diethyl carbonate and ethylene carbonate (mixture ratio (i.e., volume ratio): diethyl carbonate/ethylene carbonate=1/1) (aprotic organic solvent) was changed to 50 ml, and the additive for the non-aqueous electrolyte secondary cell was not employed in the "Preparation of non-aqueous electrolytes for non-aqueous electrolyte secondary cells" in Example 1, a non-aqueous electrolyte (viscosity at 25° C.: 3.6 mPa·s (3.6 cP)) was prepared in the same manner as that in Example 1, and self-extinguishability or flame retardancy, and deterioration resistance were evaluated. Further, a non-aqueous electrolyte secondary cell was made in the same manner as that in Example 1, and initial cell properties (such as voltage and internal resistance), charging/discharging cycle performance, and low-temperature characteristics were respectively measured and evaluated. The results are shown in table 1.

TABLE 1

| | Directly after preparation of electrolyte (Evaluation of deterioration) | | | After left for 2 months (in gloved box) (Evaluation of deterioration | | | | | Cell properties (charging/ discharging capacity (mAh/g)) | |
|---|---|---|---|---|---|---|---|---|---|---|
| Examples | Charging/ discharging capacity (mAh/g) | HF concen- tration (ppm) | Moist- ure per- centage (ppm) | Charg- ing/ dis- charg- ing capa- city (mAh/g) | HF concen- tration (ppm) | Moist- ture percen- tage (ppm) | Change of hues | Evalu- ation of de- terior- ration | After initial charg- ing/dis- charging | After 20 cycles charg- ing/dis- charging |
| Example 1 | 145 | 1 | 2 | 143 | 2 | 2 | none | stable | 145 | 143 |
| Example 2 | 145 | 1 | 2 | 142 | 1 | 2 | none | stable | 145 | 143 |
| Example 3 | 145 | 2 | 3 | 143 | 2 | 3 | none | stable | 145 | 143 |
| Example 4 | 144 | 1 | 2 | 143 | 1 | 2 | none | stable | 144 | 143 |
| Com. Example 1 | 145 | 2 | 2 | 143 | 2 | 2 | none | stable | 145 | 144 |
| Com. Example | 145 | 2 | 2 | 138 | 4 | 5 | light brown | slightly unstable | 145 | 144 |

TABLE 1-continued

| Examples | Evaluation of low-temperature characteristics (discharging capacity reduction ratio(%) in 50 cycles) 0° C. during dis-charging | −10° C. during dis-charging | −20° C. during dis-charging | Cell properties (initial internal resist-ance (Ω) | Cell-properties (initial voltage) | Self-ex-tinguish-ability/flame retar-dancy (vol %) | Content of phosphazene derivative (vol %) Con-tent of tautomer (vol %) | Tauto-mer and total con-tent of phos-phazene deriva-tive (vol %) | Viscosity of non-aqueous electro-lyte (be-fore add-ing suppor-ting salt) (mPa · s(cP)) |
|---|---|---|---|---|---|---|---|---|---|
| Example 1 | 90 | 75 | 55 | 0.12 | 2.8 | self-extinguish-ability | 1 | 2 | 2.1 |
| Example 2 | 87 | 70 | 50 | 0.13 | 2.8 | flame retar-dancy | 0.4 | 4 | 2.2 |
| Example 3 | 90 | 75 | 60 | 0.15 | 2.7 | flame retar-dancy | 15 | 30 | 2.7 |
| Example 4 | 90 | 75 | 60 | 0.12 | 2.8 | flame retar-dancy | 1.5 | 3 | 2.1 |
| Com. Example 1 | 75 | 55 | 40 | 0.13 | 2.8 | self-extinguish-ability | 0 | 2 | 2.1 |
| Com. Example 2 | 40 | 30 | 25 | 0.12 | 2.6 | flame retar-dancy | 0 | 0 | 1.8 |

<Non-aqueous Electrolyte Double Layer Capacitor>

Example 5

Preparation of a Non-aqueous Electrolytes for Non-aqueous Electrolyte Double Layer Capacitor Except that 49 ml of the mixed solvent of diethyl carbonate and ethylene carbonate was changed to 49 ml of propylene carbonate (aprotic organic solvent), and instead of dissolving $LiPF_6$ (supporting salt) in the mixture, tetraethyl ammonium fluoroborate $(C_2H_5)_4N.BF_4$ (supporting salt) was dissolved therein at the concentration of 1 mol/kg in the "Preparation of a non-aqueous electrolyte for a non-aqueous electrolyte secondary cell", a non-aqueous electrolyte for a non-aqueous electrolyte for a non-aqueous electrolyte double layer capacitor (viscosity at 25° C.: 4.0 mPa·s (4.0 cP)) was prepared in the same manner as the non-aqueous electrolyte in Example 1, whereby self-extinguishability or flame retardancy, and deterioration resistance were evaluated. The results are shown in table 2.

Preparation of Anode/Cathode (Polarizable Electrodes)

Activated carbon (Kuractive-1500 manufactured by Kuraray Chemical Co., Ltd), acetylene black (conductive agent) and tetrafluoroethylene (PTFE) (binder) are each mixed so that a massive ratio (activated carbon/acetylene black/PTFE) is 8/1/1 thus obtaining a mixture.

100 mg of the obtained mixture was sampled, and contained in a pressure tight carbon container (20 mmφ), and press-powder formed at a pressure of 150 kgf/cm$^2$ and at room temperature, whereby anode and cathode (polarizable electrodes) were made.

Preparation of a Non-aqueous Electrolyte Double Layer Capacitor

The obtained anode and cathode, and aluminum metal plate (collector) (thickness: 0.5 mm), and polypropylene/polyethylene plate (separator) (thickness: 25 μm) were used to assemble a cell. The cell was sufficiently vacuum-dried.

The cell was impregnated in the non-aqueous electrolyte, whereby a non-aqueous electrolyte electric double layer capacitor was prepared.

Measurement of Electric Conductivity of a Non-aqueous Electrolyte Electric Double Layer Capacitor While applying a constant current (5 mA) into the obtained capacitor, electric conductivity of the capacitor (conductivity of quaternary ammonium salt solution: 0.5 mol/1) was measured by a conductivity meter (CDM210 manufactured by Radio Meter Trading Co., Ltd.) The results are shown in table 2.

Further, it is a level that does not cause a practical problem as long as the electric conductivity of the non-aqueous electrolyte electric double layer capacitor at 25° C. is 5.0 mS/cm or more.

Evaluation of Low Temperature Characteristics

Further, with respect to the obtained non-aqueous electrolyte electric double layer capacitor, internal resistances (Ω) thereof were measured at 0° C., −5° C., and −10° C., respectively, and compared with the internal resistance (Ω) measured at 20° C., and evaluated. Internal resistances (Ω) at 0° C., −5° C., and −10° C. are shown in table 2.

Example 6

Except that the amount of propylene carbonate (aprotic organic solvent) was changed to 48 ml, and 1 ml of the additive for the non-aqueous electrolyte electric double layer capacitor was changed to 2 ml (4 vol %) thereof comprising 10 vol % of a tautomer (a compound represented by formula (1) in which X is a substituent (A) represented by formula (3), $R^1$ to $R^5$ individually represent an ethyl group, and $Y^1$ to $Y^2$, $Y^4$ to $Y^5$, and Z represent oxygen elements), and 90 vol % of a phosphazene derivative (a compound represented by formula (2) in which X is a substituent (A) represented by formula (3), $R^1$ to $R^5$ individually represent an ethyl group, and $Y^1$ to $Y^2$, $Y^4$ to $Y^5$, and Z represent oxygen elements) in the "Preparation of a non-aqueous electrolytes for non-aqueous electrolyte double layer capacitor", a non-aqueous electrolyte (viscosity at 25° C.: 4.2 mPa·s (4.2 cP)) was prepared in the same manner as in Example 5, whereby self-extinguishability or flame retardancy, and deterioration resistance were evaluated. Further, a non-aqueous electrolyte secondary cell was made in the same manner as that in Example 5, and electric conductivity and low-temperature characteristics were respectively measured and evaluated. The results are shown in table 2.

Example 7

Except that the amount of propylene carbonate (aprotic organic solvent) was changed to 35 ml, and the amount of the additive for the non-aqueous electrolyte electric double layer capacitor was changed to 15 ml (30 vol %) in the "Preparation of a non-aqueous electrolyte for a non-aqueous electrolyte electric double layer capacitor" in Example 5, a non-aqueous electrolyte (viscosity at 25° C.: 5.5 mPa·s (5.5 cP)) was prepared in the same manner as that in Example 1, whereby self-extinguishability or flame retardancy, and deterioration resistance were evaluated. Further, a non-aqueous electrolyte electric double layer capacitor was made in the same manner as that in Example 5, whereby electric conductivity and low-temperature characteristics were respectively measured and evaluated. The results are shown in table 2.

Comparative Example 3

Except that the amount of the additive for the non-aqueous electrolyte electric double layer capacitor was replaced by an additive for a non-aqueous electrolyte electric double layer capacitor comprising 100 vol % of a compound represented by formula (2) in which X is a substituent (A) represented by formula (2) in which X is a substi by formula (3), $R^1$ to $R^5$ individually represent an ethyl group, and $Y^1$ to $Y^2$, $Y^4$ to $Y^5$, and Z represent oxygen elements in the "Preparation of a non-aqueous electrolyte for a non-aqueous electrolyte electric double layer capacitor" in Example 5, a non-aqueous electrolyte (viscosity at 25° C.: 4.0 mPa·s (4.0 cP)) was prepared in the same manner as that in Example 5 to thereby evaluate self-extinguishability or flame retardancy, and deterioration resistance. Further, a non-aqueous electrolyte electric double layer capacitor was made in the same manner as that in Example 5, whereby electric conductivity and low-temperature characteristics were respectively measured and evaluated. The results are shown in table 2.

Comparative Example 4

Except that the amount of propylene carbonate (aprotic organic solvent) was changed to 50 ml, and the additive for the non-aqueous electrolyte electric double layer capacitor was not used in the "Preparation of a non-aqueous electrolyte" in Example 5, a non-aqueous electrolyte (viscosity at 25° C.: 3.9 mPa·s (3.9 cP)) was prepared in the same manner as that in Example 5 to thereby evaluate self-extinguishability or flame retardancy, and deterioration resistance. Further, a non-aqueous electrolyte electric double layer capacitor was made in the same manner as that in Example 5, whereby electric conductivity and low-temperature characteristics were respectively measured and evaluated. The results are shown in table 2.

TABLE 2

| | Directly after preparation of electrolyte (Evaluation of deterioration) | | | After left for 2 months (in gloved box) (Evaluation of deterioration) | | | | |
|---|---|---|---|---|---|---|---|---|
| EXAMPLES | Internal resistance (Ω) | HF concentration (ppm) | Moistture percentage (ppm) | Internal resistance (Ω) | HF concentration (ppm) | Moistture percentage (ppm) | Change of hues | Evaluation of deterioration |
| Example 5 | 0.12 | 1 | 2 | 0.12 | 1 | 2 | none | stable |
| Example 6 | 0.13 | 1 | 2 | 0.13 | 1 | 2 | none | stable |
| Example 7 | 0.15 | 1 | 2 | 0.15 | 1 | 2 | none | stable |
| Com. Example 3 | 0.16 | 1 | 3 | 0.13 | 1 | 3 | none | stable |
| Com. Example 4 | 0.12 | 1 | 1 | 0.12 | 1 | 1 | none | stable |

TABLE 2-continued

| | Evaluation of low-temperature characteristics (Ω) | | | | | | |
|---|---|---|---|---|---|---|---|
| EXAMPLES | Internal resistance (Ω) (0° C.) | Internal resistance (Ω) (−5° C.) | Internal resistance (Ω) (−10° C.) | Viscosity of non-aqueous electrolyte (before adding supporting salt) (25° C.) (mPa · s) | Viscosity of non-aqueous electrolyte (25° C.) (mPa · s) | Conductivity of non-aqueous electrolyte (25° C.) (mS/cm) | Evaluation of self-extinguishability/flame retardancy |
| Example 5 | 0.15 | 0.18 | 0.22 | 2.1 | 4.0 | 11.5 | self-extinguishability |
| Example 6 | 0.15 | 0.18 | 0.24 | 2.2 | 4.2 | 11.0 | self-extinguishability |
| Example 7 | 0.18 | 0.21 | 0.25 | 2.7 | 5.5 | 9.8 | flame retardancy |
| Com. Example 3 | 0.18 | 0.21 | 0.40 | 2.1 | 4.0 | 11.7 | self-extinguishability |
| Com. Example 4 | 0.15 | 0.18 | 0.26 | 2.5 | 3.9 | 14.0 | flame retardancy |

In the "Evaluation of low-temperature characteristics" in table 2, internal resistances (Ω) were compared with internal resistance (Ω) at 20° C., respectively. It should be noted that internal resistances in Examples 5 to 7 are relatively higher than those in Comparative examples 3 to 4 and the present invention has particularly excellent low-temperature characteristics.

The present invention can provide an additive capable of making a non-aqueous electrolyte secondary cell or a non-aqueous electrolyte double layer capacitor such that the additive is added to the non-aqueous electrolyte secondary cell or the non-aqueous electrolyte double layer capacitor which has excellent self-extinguishability, flame retardancy, deterioration resistance, and low temperature characteristics, and which has low interface resistance at a non-aqueous electrolyte. Further, the present invention can provide a non-aqueous electrolyte secondary cell or a non-aqueous electrolyte double layer capacitor which has excellent self-extinguishability, flame retardancy, and deterioration resistance, and low temperature characteristics, and which has low interface resistance at a non-aqueous electrolyte.

What is claimed is:

1. An additive used for a non-aqueous electrolyte secondary cell or a non-aqueous electrolyte electric double layer capacitor containing at least a compound represented by the following formula (1) and a phosphazene derivative represented by the following formula (2):

Formula (1):

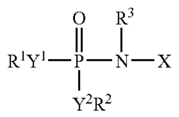

Formula (2):

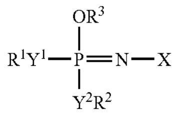

wherein $R^1$, $R^2$ and $R^3$ independently represent a monovalent substituent or a halogen element; X represents a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$ and $Y^2$ independently represent a divalent connecting group, a divalent element or a single bond.

2. A non-aqueous electrolyte secondary cell comprising an additive for a non-aqueous electrolyte secondary cell comprising:

an anode;

a cathode; and a non-aqueous electrolyte, the non-aqueous electrolyte comprising a supporting salt and containing at least a compound represented by the following formula (1) and a phosphazene derivative represented by the following formula (2):

Formula (1):

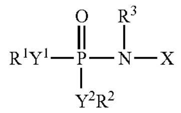

Formula (2):

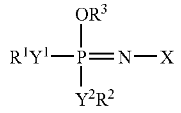

wherein $R^1$, $R^2$ and $R^3$ independently represent a monovalent substituent or a halogen element; X represents a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$ and $Y^2$ independently represent a divalent connecting group, a divalent element or a single bond.

3. The non-aqueous electrolyte secondary cell of claim 2, wherein a total amount of the compound represented by formula (1) and a total amount of the phosphazene derivative represented by formula (2) in the non-aqueous electrolyte is 1 vol % or more, respectively.

4. The non-aqueous electrolyte secondary cell of claim 2, wherein a total amount of the compound represented by formula (1) and a total amount of the phosphazene derivative represented by formula (2) in the non-aqueous electrolyte is 2 vol % or more, respectively.

5. The non-aqueous electrolyte secondary cell of claim 2, wherein a total amount of the compound represented by formula (1) and a total amount of the phosphazene derivative represented by formula (2) in the non-aqueous electrolyte is 20 vol % or more, respectively.

6. The non-aqueous electrolyte secondary cell of claim 2, wherein a total amount of the compound represented by formula (1) and a total amount of the phosphazene derivative represented by formula (2) in the non-aqueous electrolyte is 30 vol % or more, respectively.

7. The non-aqueous electrolyte secondary cell of claim 2, wherein the non-aqueous electrolyte contains an aprotic organic solvent.

8. The non-aqueous electrolyte secondary cell of claim 7, wherein the aprotic organic solvent contains one of cyclic ester compounds and chain ester compounds.

9. The non-aqueous electrolyte secondary cell of claim 2, wherein the non-aqueous electrolyte comprises: $LiPF_6$ as the supporting salt; ethylene carbonate and/or propylene carbonate as the aprotic organic solvent; and the compound represented by formula (1) and the phosphazene derivative represented by formula (2) in a total amount of 1.5 to 2.5 vol %, respectively.

10. The non-aqueous electrolyte secondary cell of claim 2, wherein the non-aqueous electrolyte comprises: $LiPF_6$ as the supporting salt; ethylene carbonate and/or propylene carbonate as the aprotic organic solvent; and the compound represented by formula (1) and the phosphazene derivative represented by formula (2) in a total amount of more than 2.5 vol %, respectively.

11. The non-aqueous electrolyte secondary cell of claim 2, wherein the non-aqueous electrolyte comprises: LiCF3 $SO_3$ as the supporting salt; propylene carbonate as the aprotic organic solvent; and the compound represented by formula (1) and the phosphazene derivative represented by formula (2) in a total amount of 1.5 to 2.5 vol %, respectively.

12. The non-aqueous electrolyte secondary cell of claim 2, wherein the non-aqueous electrolyte comprises: LiCF3 $SO_3$ as the supporting salt; propylene carbonate as the aprotic organic solvent; and the compound represented by formula (1) and the phosphazene derivative represented by formula (2) in a total amount of more than 2.5 vol %, respectively.

13. A non-aqueous electrolyte electric double layer capacitor comprising an additive for a non-aqueous electrolyte secondary cell comprising:

an anode;

a cathode; and a non-aqueous electrolyte, the non-aqueous electrolyte comprising a supporting salt and containing at least a compound represented by the following formula (1) and a phosphazene derivative represented by the following formula (2):

Formula (1):

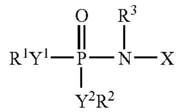

Formula (2):

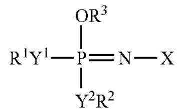

wherein $R^1$, $R^2$ and $R^3$ independently represent a monovalent substituent or a halogen element; X represents a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$ and $Y^2$ independently represent a divalent connecting group, a divalent element or a single bond.

14. The non-aqueous electrolyte electric double layer capacitor of claim 13, wherein a total amount of the compound represented by formula (1) and a total amount of the phosphazene derivative represented by formula (2) in the non-aqueous electrolyte is 1 vol % or more, respectively.

15. The non-aqueous electrolyte electric double layer capacitor of claim 13, wherein a total amount of the compound represented by formula (1) and a total amount of the phosphazene derivative represented by formula (2) in the non-aqueous electrolyte is 2 vol % or more, respectively.

16. The non-aqueous electrolyte electric double layer capacitor of claim 13, wherein a total amount of the compound represented by formula (1) and a total amount of the phosphazene derivative represented by formula (2) in the non-aqueous electrolyte is 20 vol % or more, respectively.

17. The non-aqueous electrolyte electric double layer capacitor of claim 13, wherein a total amount of the compound represented by formula (1) and a total amount of the phosphazene derivative represented by formula (2) in the non-aqueous electrolyte is 30 vol % or more, respectively.

18. The non-aqueous electrolyte electric double layer capacitor of claim 13, wherein the non-aqueous electrolyte contains an aprotic organic solvent.

19. The non-aqueous electrolyte electric double layer capacitor of claim 18, wherein the aprotic organic solvent contains one of cyclic ester compounds and chain ester compounds.

20. The additive of claim 1, wherein X in formula (1) is a substituent represented by one of the following substituents (A) or (C):

substituent (A)

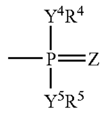

substituent (C)

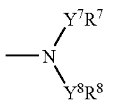

wherein in substituents (A) and (C): $R^4$, $R^5$, $R^7$ and $R^8$ independently represent a monovalent substituent or a halogen element; $Y^4$, $Y^5$, $Y^7$ and $Y^8$ independently represent a divalent connecting group, a divalent element or a single bond; and Z represents a divalent group or a divalent element.

21. The non-aqueous electrolyte secondary cell of claim 2, wherein X in formula (1) is a substituent represented by one of the following substituents (A) or (C):

substituent (A)

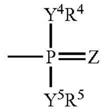

substituent (C)

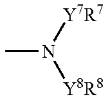

wherein in substituents (A) and (C): $R^4$, $R^5$, $R^7$ and $R^8$ independently represent a monovalent substituent or a halogen element; $Y^4$, $Y^5$, $Y^7$ and $Y^8$ independently represent a divalent connecting group, a divalent element or a single bond; and Z represents a divalent group or a divalent element.

22. The non-aqueous electrolyte electric double layer capacitor of claim 13, wherein X in formula (1) is a substituent represented by one of the following substitutents (A) or (C):

substituent (A)

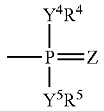

substituent (C)

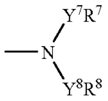

wherein in substituents (A) and (C): $R^4$, $R^5$, $R^7$ and $R^8$ independently represent a monovalent substituent or a halogen element; $Y^4$, $Y^5$, $Y^7$ and $Y^8$ independently represent a divalent connecting group, a divalent element or a single bond; and Z represents a divalent group or a divalent element.

* * * * *

UNITED STATES PATENT AND TRADEMARK OFFICE

CERTIFICATE OF CORRECTION

PATENT NO. : 7,067,219 B2

APPLICATION NO. : 10/363172

DATED : June 27, 2006

INVENTOR(S) : Masashi Otsuki, Shigeki Endo and Takao Ogino

It is certified that error appears in the above-identified patent and that said Letters Patent is hereby corrected as shown below:

Column 11, line 13, change “Anode” to --Cathode--;
line 14, change “anodes” to --cathodes--;
line 15, change “anode” to --cathode--;
line 24, change “anode” to --cathode--;
line 28, change “Cathode” to --Anode--;
line 29, change “a cathode” to --an anode--;
line 31, change “cathode” to --anode--; and
line 39, change “a cathode” to --an anode--.

Column 14, line 19, change “cathode” to --anode--.

Column 15, line 14, change “an anode” to --a cathode--;
line 31, change “anode” to --cathode--;
line 32, change “anode” to -- cathode--;
line 48, change “Anode” to --Cathode--; and
line 49, change “an anode” to --a cathode--.

Column 16, line 5, change “anode” to --cathode--;
line 23, change “Cathode” to --Anode--;
line 24, change “a cathode” to --an anode--; and
line 25, change “anode” to --cathode--.

Column 21, line 20, change “an anode” to --a cathode--;
line 25, change “anode” to --cathode--;
line 29, change “anode” to --cathode--;
line 32, change “anode” to --cathode--; and
line 35, change “an anode” to --a cathode--.

Signed and Sealed this

Sixteenth Day of October, 2007

JON W. DUDAS

*Director of the United States Patent and Trademark Office*